United States Patent
Chiang

[11] 3,901,182
[45] Aug. 26, 1975

[54] SILICON SOURCE FEED PROCESS
[75] Inventor: Ping-Wang Chiang, Melbourne Beach, Fla.
[73] Assignee: Harris Corporation, Cleveland, Ohio
[22] Filed: May 18, 1972
[21] Appl. No.: 254,748

[52] U.S. Cl. ............. 118/49; 137/340; 117/106 A; 203/49; 55/269
[51] Int. Cl. ........................................... C23c 13/08
[58] Field of Search ...... 137/334, 341, 340; 118/49, 118/48; 117/106 A, 106 R; 261/77, 121, 140, 152; 23/350; 202/161, 185, 189; 203/49, 86; 55/269

[56] References Cited
UNITED STATES PATENTS

| | | |
|---|---|---|
| 3,173,802 | 3/1965 | Patel et al. ............... 117/106 A UX |
| 3,397,731 | 8/1968 | Gravis et al. ................... 203/49 X |
| 3,410,286 | 11/1968 | Satake ........................... 137/341 X |
| 3,414,522 | 12/1968 | Hoekstra ....................... 137/340 X |
| 3,424,192 | 1/1969 | Rayneri ............................... 137/340 |
| 3,523,046 | 8/1970 | Grochowski et al. ...... 117/106 A X |
| 3,534,765 | 10/1970 | King et al. ............................ 137/341 |
| 3,549,413 | 12/1970 | McCandless et al. ........... 117/106 R |
| 3,581,766 | 6/1971 | Gimigliano ....................... 118/49 X |
| 3,632,439 | 1/1972 | Deklerk ............................ 118/49 X |
| 3,658,680 | 4/1972 | Combe et al. .................... 118/49 X |
| 3,683,848 | 8/1972 | Plumat et al. ....................... 118/49 |
| 3,699,917 | 10/1972 | Deverse et al. ..................... 118/49 |
| 3,717,119 | 2/1973 | Boys et al. ........................... 118/49 |
| 3,735,728 | 5/1973 | Krumme et al. ..................... 118/49 |

Primary Examiner—Henry T. Klinksiek

[57] ABSTRACT

A process is disclosed for chemical vapor deposition (CVD) of silicon onto a substrate. In the process hydrogen gas is bubbled through a suitable liquid source of silicon, such as $SiCl_4$ or $SiHCl_3$, to evaporate liquid therefrom and to carry the vapor in a gas stream. A constant temperature reflex condenser is used to control the concentration of the gas stream. The said bubbler is maintained at room temperature and the said condenser is maintained at a temperature which is the lowest in the entire CVD system, and below the lowest possible temperature of the liquid source attributable to heat loss through vaporization. The effluent gas stream of the condenser is at a substantially constant temperature, and the concentration of vapor in the gas stream is thus held substantially constant through the deposition process of the silicon onto the substrate.

15 Claims, 1 Drawing Figure

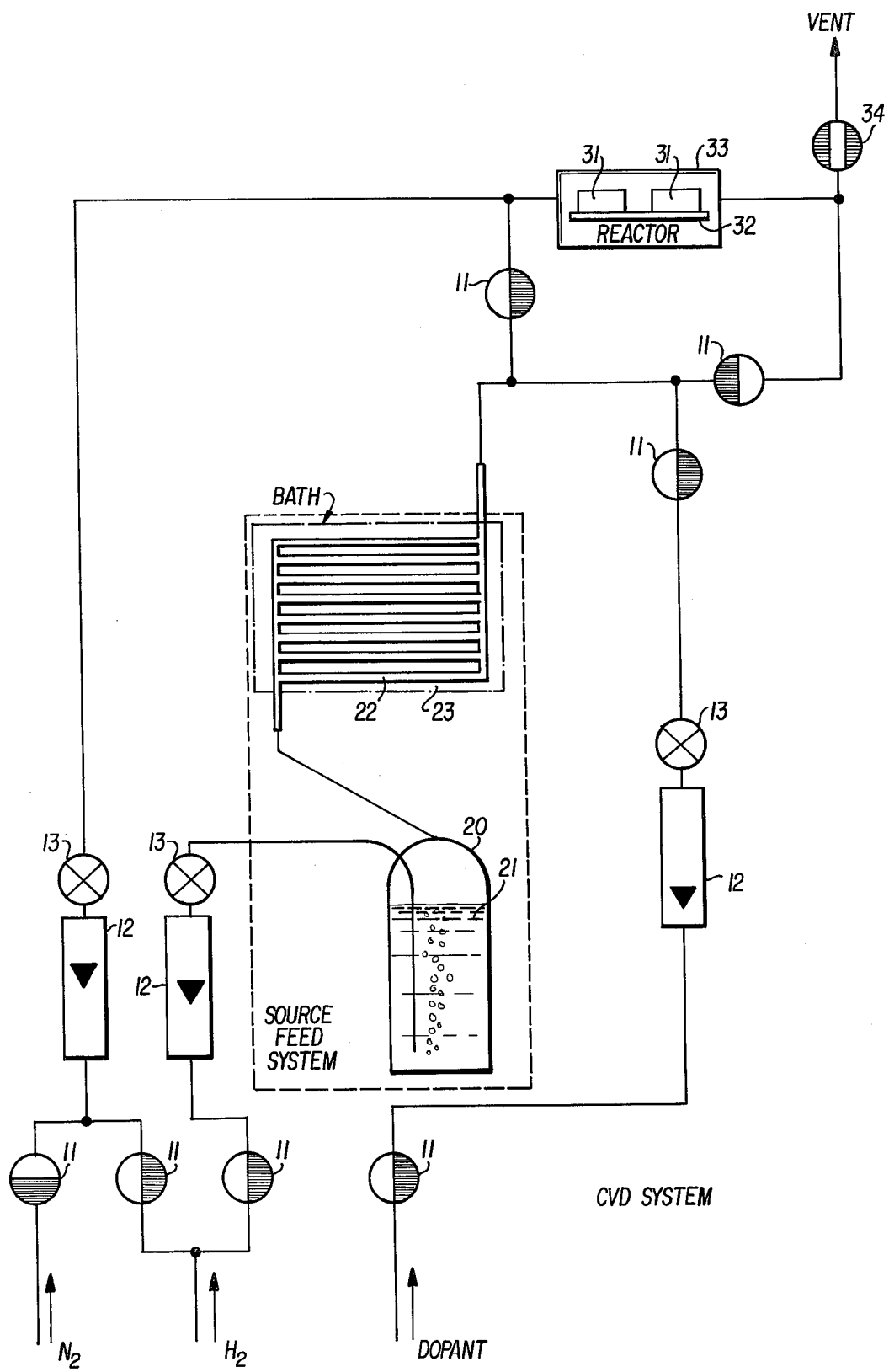

SILICON SOURCE FEED PROCESS

BACKGROUND OF THE INVENTION

1. Field:

The present invention resides in the field of semiconductor material and device fabrication, and is specifically directed to improved methods and apparatus for obtaining precise concentrations of selected vapors as necessary to deposit semiconductor material of desired purity or impurity in crystalline or amorphous states on a suitable substrate.

2. Prior Art:

In the past, it has been common practice to achieve poly or epitaxial deposition of silicon on a silicon body of perhaps different resistivity by hydrogen reduction of the halogen derivatives of silanes. Typically, hydrogen ($H_2$) is bubbled through a container of liquid silanes maintained in a constant temperature bath (e.g., 0°C). The effluent gas is diluted and introduced into a reaction chamber (reactor) containing the substrates on which the deposition is to be performed.

Maintenance of constant temperature of the bubble chamber is to assure a consistent precise concentration of the gas introduced into the reactor. However, it has been found that this temperature control is unstable, in that at the outset the temperature of the liquid within the container is virtually equal to the temperature of the external bath, but gradually over a relatively short period of time, say 15 to 20 minutes depending upon the hydrogen gas flow (e.g., the rate of bubbling), the temperature of the liquid decreases, up to several degrees below that of the external bath temperature. This undesirable result is attributable to heat of vaporization occurring during the bubbling action; that is to say, heat is carried away by the vapor. Clearly, the effect is to upset the desired precise concentration of gases entering the reactor.

Another process sometimes employed in epitaxial deposition is to simply allow the hydrogen gas to flow through the surface of the liquid in the container which is immersed in a constant temperature bath. Since some of the liquid has evaporated this gaseous component is carried by the flowing hydrogen gas into the reactor. However, the precise concentration is even less controllable using this technique than is attainable using the previously described technique.

These prior art processes require a waiting period after the bubbler has been refilled with a room temperature liquid before the liquid is cooled down to the desired temperature. This waiting period, depending on the size of the bubbler and the means of cooling, may extend as long as several hours for each refilling.

OBJECTS OF THE INVENTION

The principal object of the present invention is to provide a process which assures a consistent, continuous precise concentration of gases into the reactor to produce a desired deposition, or to incorporate a desired number of impurity atoms into the crystal lattice of the growing layer, or for any other reason that a precise concentration of gases in the reactor is desired.

Another object of this invention is to provide a process which does not require a waiting period after refilling the bubbler with a room temperature liquid.

Yet another object of this invention is to provide a process which assures a low installation cost, a low maintenance cost, a high reliability, and a high stability.

Other objects will be in part obvious and in part pointed out more in detail hereafter.

BRIEF DESCRIPTION OF THE DRAWING

The above and other objects, features and attendant advantages of the invention will become apparent from a consideration of the following detailed description, taken in conjunction with the accompanying drawing The single FIGURE is a simplified schematic diagram of a presently preferred silicon CVD system. The silicon source feed system is the portion enclosed in the dotted line of this figure.

DETAILED DESCRIPTION

In the simplified schematic diagram of the single FIGURE, a feed system is shown by which a precise concentration of vapors of a particular source material may be produced for deposition of the desired material on a substrate. For purposes of conformance with the statutory requirement, this description of a preferred exemplary process and system will be with specific reference to the use of compositions from which silicon of desired purity may be derived. However, the reader will readily appreciate that the principles of the invention are applicable to feed systems utilizing a wide range of source compositions and materials.

Referring to the FIGURE, the system includes a plurality of inlets for introduction of such gases as an inert purge gas (e.g., $N_2$), a carrier gas (e.g., $H_2$), and a dopant gas if impurities are to be controllably added to the material as it is deposited. Fluid conduits in which ON/OFF valves 11, flowmeters 12, and flow controllers 13 are positioned serve in a conventional manner to transfer the gases through the system. Spent gases may be vented to the scrubber via a valve 34.

The carrier gas $H_2$ is measured by a flowmeter 12 and its rate of flow is controlled by a flow controller 13 prior to introduction into a bubbler 20. There, the hydrogen is bubbled through a liquid silicon source 21, typically one of the silanes such as silicon tetrachloride ($SiCl_4$) or trichlorosilane ($SiHCl_3$), which is contained in the bubbler 20.

Unlike the practice heretofore in which the bubbler was maintained in a constant temperature bath, the bubbler in the present invention is merely subjected to ambient room temperature. The effluent gas from the bubbler enters a condenser 22 maintained physically above the bubbler in the gas line for reasons which will be explained presently. In the condenser the excess vapor in the process gas is condensed and reflexed back to the bubbler as the gas is cooled. The process gas from the condenser is then conducted into a reaction chamber 33 which contains a susceptor 32 and substrates 31.

In the reaction chamber the substrates are maintained at an elevated temperature conducive to the desired reaction (typically, from 900°C to 1300°C in the case of silicon deposition). The silicon is epitaxially deposited on each substrate, as a single crystal extension where the substrate has an exposed layer of silicon of single crystal lattice structure, or as a polycrystalline layer on an exposed portion of the substrate of other than a single crystal lattice structure. It will be appreciated that the substrate may be a refractory material, an amorphous film or any other suitable material, rather than single crystal semiconductor material, on which material is to be deposited by chemical vapor deposition. If a dopant is added to the process gas, impurity atoms are incorporated in the crystal lattice of the growing layer.

To assure that a consistent, continuous precise concentration of gases is introduced into the reactor to produce a desired deposition, to incorporate a desired concentration of impurity atoms, or for other reasons, it is essential that the process gas leaving a source feed system be maintained at a constant temperature. The temperature of the silicon source liquid in bubbler 20 gradually decreases during the process because of the heat removal resulting from vaporization of the liquid. In the course of the process this drop in temperature can be up to several degrees below the temperature at which the bubbler is maintained, which in the specific example described here is simply room temperature. In accordance with a principal aspect of the present invention, condenser 22 is utilized in the feed system and is immersed in a constant temperature bath 23. The bath is maintained at a temperature which is the lowest in the entire CVD system and below the lowest possible temperature of the liquid in bubbler 20 to be encountered during the entire process. For example, the bath temperature may be kept at 10°C, 5°C, 0°C, or the like, depending upon the lowest possible temperature of the liquid source which may be brought on by vaporization. As the process proceeds, the temperature of the gas stream entering the condenser may vary for several minutes after start-up. But the temperature of the effluent gas is controlled by the action of the bath-immersed condenser, and remains constant throughout the process. During the process excess vapor condenses and returns, by gravity, to the bubbler 20. The effluent gas from the condenser 22 is saturated with the vapor. A consistent precise concentration of vapor is thus obtained. Obviously, the condenser is operated under a convenient constant pressure condition.

For the sake of clarity and conciseness, components of the system which are not necessary to an understanding of the invention are not shown in the FIGURE or described herein. Such components include gas lines for HCl or $CO_2$, the heater for reactor 33, the temperature control loop for constant temperature bath 23, the liquid level controller for the bath, the liquid level monitor/controller for bubbler 20, and the valves and pipe connections for draining, cleaning and purging the system, for example.

In practice, a plurality of condensers may be used in a feed system, one associated with the liquid source for each feed stream to the reactor. The entire set of condensers may be installed in a common constant temperature bath, using a plate-coil type heat exchanger, for example, thereby further reducing equipment costs. Each condenser should be sufficiently large to bring the temperature of the effluent gas to within 0.5°C of the coolant temperature.

While the invention has been described in conjunction with a process for epitaxial deposition (broadly encompassing both single crystal and polycrystalline deposition) of silicon, it may readily be applied to any vapor deposition process using a liquid compound as the source. Examples include film deposition of germanium, silicon carbide, silicon dioxide, and silicon nitride; control of vapor concentration of a dopant when a liquid is used as the source of the dopant; and the like.

I claim:

1. A chemical vapor deposition feed system for deposition of material from a vapor onto a substrate, said system comprising,
    a liquid source of the material to be deposited,
    means for passing a carrier gas through said liquid source to evaporate liquid therefrom,
    conduit means for receiving the vapor-carrying gas stream issuing from said liquid source, and
    heat exchange means connected to said conduit means downstream of said liquid source for condensing a portion of the vapor in the gas stream and returning the condensed vapor to said liquid source, to maintain the effluent vapor-carrying gas stream from said heat exchange means at a substantially constant temperature whereby the vapor concentration of source material in said gas stream remains substantially constant throughout deposition of said material onto a substrate.
2. The system according to claim 1, wherein said condensed portion of the vapor is the excess over that necessary to maintain the effluent gas stream of the heat exchange means saturated with said vapor.
3. The system according to claim 1, wherein said liquid is confined in a container maintained at room temperature.
4. The system according to claim 3, wherein is included
    means for maintaining said heat exchange means at a constant temperature which is the lowest in the entire chemical vapor deposition system and below the lowest possible temperature of said liquid source attributable to heat loss from vaporization.
5. The system according to claim 1, wherein is provided
    means for cooling said heat exchange means to a constant temperature below the temperature of said liquid source, to maintain the temperature of said effluent gas stream of said heat exchange means within approximately 0.5°C of said constant temperature of the heat exchange means.
6. The system according to claim 1, wherein the deposited material is a semiconductor.
7. The system according to claim 6, wherein said semiconductor is substantially pure.
8. The system according to claim 6, wherein is included
    means for introducing a dopant gas stream into the gas stream containing said vapor in the vicinity of said substrate, to provide a predetermined impurity concentration in the otherwise pure deposited semiconductor.
9. The system according to claim 1, wherein said substrate comprises a semiconductor.
10. The system according to claim 1, wherein said substrate is a single crystal.
11. The system according to claim 1, wherein said substrate is a refractory material.
12. The system according to claim 1, wherein said substrate is an amorphous film.
13. The system according to claim 1, wherein said material to be deposited is silicon, and said liquid source is a composition selected from the group consisting of $SiCl_4$ and $SiHCl_3$.
14. The system according to claim 13, wherein said carrier gas is hydrogen.
15. The system according to claim 4, wherein said heat exchange means is disposed above said liquid source to return the condensed vapor to said liquid source by gravity.

* * * * *